United States Patent [19]
Glasser

[11] Patent Number: 5,301,510
[45] Date of Patent: Apr. 12, 1994

[54] SELF-POWERED SLUSH MAINTENANCE UNIT

[75] Inventor: Sidney P. Glasser, Fullerton, Calif.

[73] Assignee: Rockwell International Corporation, Seal Beach, Calif.

[21] Appl. No.: 950,522

[22] Filed: Sep. 25, 1992

[51] Int. Cl.$^5$ .............................................. F17C 5/00
[52] U.S. Cl. ........................................ 62/54.1; 62/10; 62/53.2; 62/239; 244/135 R
[58] Field of Search ............... 62/10, 53.2, 54.1, 237, 62/239, 243; 244/135 R

[56] References Cited

U.S. PATENT DOCUMENTS

| | | | |
|---|---|---|---|
| 3,354,662 | 11/1967 | Daunt | 62/10 |
| 3,521,458 | 7/1970 | Huibers et al. | 62/54.1 |
| 4,386,950 | 7/1983 | Bell et al. | 62/10 |
| 5,154,062 | 10/1992 | Gaumer, Jr. et al. | 62/54.1 |
| 5,168,710 | 12/1992 | Miyazaki | 62/54.1 |

*Primary Examiner*—Henry A. Bennet
*Assistant Examiner*—C. Kilner
*Attorney, Agent, or Firm*—Terrell P. Lewis; Charles T. Silberberg

[57] ABSTRACT

A self-powered, mobile maintenance apparatus for continuously supplying slush hydrogen as a powering fuel to an aerospace vehicle prior to take-off including a first apparatus for obtaining liquid hydrogen from the vehicle, a second apparatus for generating slush hydrogen, a third apparatus for delivering the liquid hydrogen obtained from the vehicle to the second apparatus for generating slush hydrogen so that the liquid hydrogen can be converted to slush hydrogen, pump apparatus communicating with the second apparatus generating slush hydrogen for developing a vacuum in a region of the second apparatus for generating slush hydrogen so that a solid hydrogen fraction is produced, and apparatus for delivering the slush hydrogen mixture to the aerospace vehicle to be used as the powering fuel. In comparison with similar conventional systems, the apparatus of the invention facilitates a substantial reduction in size and power requirements for producing slush hydrogen, provides all power required by the mobile unit, elimininates the need for a burn stack, and provides extra energy for secondary functions.

10 Claims, 1 Drawing Sheet

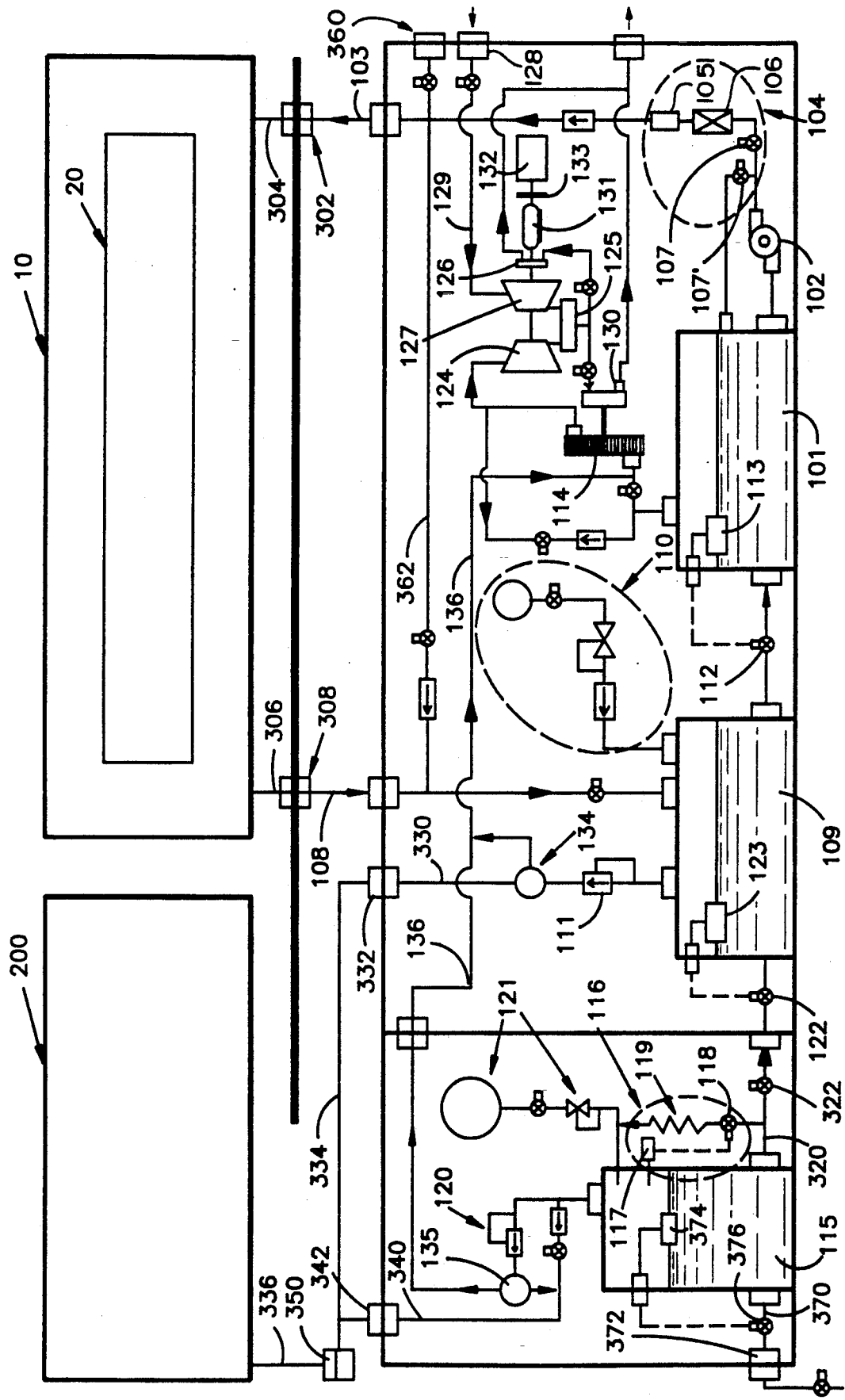

SELF-POWERED SLUSH MAINTENANCE UNIT

STATEMENT OF GOVERNMENT INTEREST

This invention was made with Government support under Contract No. F33657-91-C-2012 awarded by the United States Air Force. The Government has certain rights in this invention.

BACKGROUND OF THE INVENTION

1. Field of the Invention

The present invention relates to processes and apparatus for the continuous production of slush hydrogen, and more particularly to a ground-based Slush Maintenance Unit (SMU) having a size and power capability enabling its incorporation into mobile ground service equipment adapted for continuously maintaining the fuel density and quantity required prior to takeoff of an aerospace vehicle which uses slush hydrogen (SH2) as a fuel.

2. Background of the Invention

One direction of aerospace research today is the development of long range, hypersonic space vehicles which will journey from earth to various points in outer space. Recently, vehicles of this type have originated from work under the National AeroSpace Program, commonly referred to as the NASP program.

For a NASP-type vehicle using slush hydrogen as a fuel, there is a requirement to maintain the slush quality (density) in the vehicle's tanks until a very short time before take-off to assure the correct propellant load for flight. Often unavoidably heat leaks into the propellant to cause a proportional amount of solid hydrogen to melt. To prevent a decrease in propellant density and a corresponding increase in propellant volume, with a potential overflow of liquid hydrogen, the melted hydrogen (triple-point liquid) must be continuously removed from the vehicle and replaced by an equal mass of solid hydrogen. Inasmuch as solid hydrogen alone cannot be transported through a pipe, the hydrogen is transported as a slurry of triple-point liquid hydrogen and solid hydrogen (a mixture known as "slush hydrogen").

For a fixed "launch pad" vehicle, such as the Shuttle or the Saturn rocket, the slush hydrogen could be supplied from a facility storage tank, and the off-loaded triple-point liquid hydrogen could be collected and stored in a second tank.

On the other hand, "aircraft" vehicles such as the NASP-type vehicles must be fueled at a loading facility located remotely from the runway, and then the vehicle must be towed to the end of the runway for takeoff. Due to unavoidable heat leaks into the propellant during the tow period (up to 1 hour in duration), the melting solids in the SH2 will cause an expansion of the propellant volume and result in a potentially catastrophic spilling of liquid hydrogen from the tank vent valves. To prevent such spilling of liquid hydrogen, a mobile Slush Maintenance Unit (SMU) is required. The SMU will accompany the vehicle during the tow period as well as any subsequent hold periods prior to takeoff. The function of the SMU is to take the excess triple point liquid hydrogen from the vehicle, convert it back to slush hydrogen, and then return the slush hydrogen to the vehicle tanks to maintain the required fuel density and volume.

The essential components of a slush maintenance unit would be (1) a tank to catch the triple point liquid hydrogen returning from the vehicle, (2) a slush generator to convert the triple point liquid hydrogen back to slush hydrogen with an appropriate solid fraction, (3) a makeup tank of liquid hydrogen to replace the liquid hydrogen lost in the slush hydrogen production process, (4) a means to safely dispose of hydrogen vapor that is generated in the production process, and (5) an energy source to provide power for required compressors, pumps, heaters, etc.

The slush generator is the central component inasmuch as the operating characteristics and efficiency of the slush generator defines the power requirements, quantity of required makeup hydrogen, required capacity of the slush hydrogen disposal system, and the overall size of the combined unit.

The current, most common method of producing slush hydrogen is the "freeze-thaw" process. In this process, refrigeration for solidification of part of the hydrogen is obtained by cyclically reducing the ullage pressure in a container of liquid hydrogen to the triple point pressure of 1.02 PSIA. Evaporation of part of the liquid chills the bulk down to the triple point temperature of 24.8° R. and the subsequent conversion of part of the bulk to solid hydrogen. The resulting mixture of triple point liquid hydrogen and solid hydrogen is "slush hydrogen".

To obtain the requisite low pressure over the bulk hydrogen, large capacity, low speed positive displacement vacuum pumps must be used. Typically, these vacuum pumps are driven by electric motors, which require large quantities of electrical power for operation. Thus, for slush hydrogen producing facilities of known capacities, a major power supply capability is required.

Due to the slow speed of the positive displacement vacuum pumps, the size and weight of the machinery becomes quite large for even a moderate refrigeration requirement. The problem is further aggravated by the fact that currently-available piston-type vacuum pumps require essentially room-temperature gas 60° F., 520° R.) at their inlets because of mechanical constraints.

An additional substantial amount of electrical power is required to heat the vapor from 24.8° R. to 520° R., thereby aggravating the facility electrical power requirement. Heating the vapor results in a volume increase by a factor of approximately 22, thereby greatly aggravating the size, weight, and power requirements for the vacuum pumps. In current practice, the hydrogen vapor discharged from the vacuum pumps is ducted to a burn stack for safe disposal. To dispose of the amount of hydrogen vapor to support a NASP-size vehicle will require a large burn stack located a substantial distance away from the vehicle, plus a long, large-diameter line to duct the hydrogen to the burn stack.

This situation, considering machinery size and weight, power requirements, and associated hardware for a slush maintenance unit based on current practice, would result in a formidable piece of Ground Service Equipment (GSE), even for a stationary, launch-pad-type of support facility. Incorporating such a slush management unit of this type into a mobile unit would require a piece of GSE approaching, or even exceeding, the size of the mobile launch platforms used for Saturn and shuttle launches. Moreover, supplying power to this mobile unit would require a very large on-board power generator, such as a diesel-electric generator. Moreover, the burn stack for disposal of the waste hydrogen vapor would resemble a large smoke-stack. The burn stack would have to be towed behind the mobile unit to provide continuous disposal of hydrogen vapor to prevent explosive accumulations of hydrogen.

OBJECTS OF THE INVENTION

It is therefore an object of the present invention to provide a novel self-powered maintenance unit for a slush hydrogen generating and distribution system for use with aerospace vehicles which will overcome all the disadvantages and drawbacks of the currently known systems.

Another object of the present invention is to provide a system for continuously maintaining a predetermined minimum level of slush hydrogen density in the tanks of a NASP-type vehicle prior to take-off to assure the correct propellant load for flight.

Still another object of the present invention is to provide a novel apparatus for continuously preventing decreases in slush hydrogen propellant density and corresponding increases in propellant volume by converting excess liquid formed from melting solids back to slush hydrogen.

Yet another object of the invention is to provide a novel apparatus which, in conjunction with aerospace components, maintains the proper slush hydrogen density and quantity on-board the vehicle during ground operations, including during the tow period.

BRIEF DESCRIPTION OF THE DRAWINGS

FIG. 1 is a schematic diagram of the slush hydrogen maintenance apparatus of the present invention and its relationship to the vehicle.

DETAILED DESCRIPTION OF THE INVENTION

Looking now to the Figure, there is shown a preferred embodiment of the slush hydrogen maintenance unit (SMU) of the present invention in conjunction with a typical aerospace vehicle. Assembly 10 represents one or more tanks within the vehicle for storing slush hydrogen. Apparatus 20, located within assembly 10, includes various types of airborne equipment which could be disposed inside the vehicle tanks to support the slush maintenance operation. Such equipment includes, but is not limited to, liquid level sensors, density gauges or sensors, overflow tubes, pumps, pressure regulators, valves and mixing devices.

As seen in the Figure, a slush generator 101 is incorporated as part of the Slush Maintenance Unit. Any of several concepts for the slush generator can be used in the SMU assembly. The only requirement, however, is that the slush generator must be capable of continuous and high rate slush hydrogen production. Selection of a specific slush generator concept would be based primarily on size and power requirements as well as the required quantity of liquid hydrogen production for the necessary slush hydrogen production rate and duration. For example, an apparatus which can be adapted to an SMU assembly is one which employs an evaporative cooling process.

For purposes of this invention, the description is based on the integration of an evaporative freezing process, it being understood that other refrigeration concepts (as for example, an expansion/compression refrigeration cycle) may be just as readily usable with the system of the present invention.

Pump 102 in the Figure takes slush hydrogen from the slush hydrogen generator and pumps it into the vehicle tank(s) through line 103. Line 103 passes through the outer wall of the slush maintenance unit at a sealable fitting 302 to connect with a conduit 304 which leads to the vehicle fuel tank(s).

Delivery control assembly 104 consists of a density sensor 105, a venturi (flowmeter) 106, and valves 107, 107' for measuring and controlling the density and flow rate of the slush hydrogen being pumped to the vehicle. The flowrate is varied in response to signals from on-board density sensors (included in apparatus 20) to attain and maintain the desired average propellant density within the vehicle tank(s).

The pressure within the vehicle fuel tank(s) is maintained in the range of 5 psig by a pressure regulator included within apparatus 20 during the density maintenance operation. The excess triple point liquid hydrogen formed by the continuous melting of solid hydrogen in the slush hydrogen in the vehicle's fuel tank(s) is removed through an overflow tube 306 (part of apparatus 20) and is directed out of the vehicle through sealable fitting 308 to line 108, which carries the triple liquid hydrogen returning from tank(s) 10 to the triple point catch tank 109.

The pressure in the catch tank 109 is maintained in the range of 0–1 psig by a helium driven pressure regulator assembly 110 and a relief valve 111. The pressure differential between vehicle fuel tank(s) 10 and the triple point catch tank 109 provides up to 5 psig to pressure feed the triple point liquid hydrogen through line 108.

The liquid hydrogen from the catch tank 109 is metered through a valve 112 to the slush generator 101 in response to a liquid level sensor 113 within the slush generator. Vacuum pump 114 draws vapor out of the slush generator, thereby providing an evaporative cooling effect in the bulk liquid hydrogen. At 1.02 PSIA (the triple-point pressure), some of the liquid hydrogen will be converted to solid hydrogen thereby creating a slush hydrogen mixture within the slush hydrogen generator.

The evaporated hydrogen from the slush generator 101 constitutes a loss of mass in the vehicle/slush maintenance unit system, which is replaced by liquid hydrogen from the liquid hydrogen make-up tank 115. A fluid line 320, which conveys liquid hydrogen from tank 115 to catch tank 109, is selectively blocked via valve 322.

The liquid hydrogen is maintained at a pressure of 2–3 PSIG by a "bootstrap" hydrogen pressurization system 116 consisting of a pressure sensor 117, a liquid hydrogen control valve 118, a heat exchanger 119, as well as a relief valve 120. The helium pressure regulator 121 provides backup pressurization for the liquid hydrogen makeup tank. The flow from the liquid hydrogen makeup tank to the triple point catch tank is metered by valve 122 in response to signals from the liquid level sensor 123. The differential pressure of approximately 2 psi between the two tanks permits the makeup liquid hydrogen to be pressure fed to the triple point catch tank.

The vacuum pump 114 at the slush hydrogen generator 101 is an axial flow and/or centrifugal-flow device, which can operate at speeds on the order of 20,000 rpm or greater. The vacuum pump takes cold vapor directly from the slush hydrogen generator, thereby taking advantage of the highest density inlet vapor. Compared to a currently-used positive displacement vacuum pump with the required heater to heat the incoming vapor to approximately 60° F. (520° R.), for the same mass flow rate of hydrogen vapor the cold inlet vacuum pump has approximately 1/22 the volumetric flow rate of the positive displacement pump. By operating at high speed, the size of the axial-flow and/or centrifugal-flow vacuum pump can be quite small for a given volumetric flow. Assuming all vacuum pumps discharge to ambient pressure (approx. 15 PSIA), the power input to the cold-inlet vacuum pump will be about 1/30 of the power required for a positive displacement vacuum pump and its associated inlet heater. From the foregoing, it is seen that dramatic reductions in vacuum pump size and power requirements can be attained by the apparatus of the present invention.

Instead of diverting the vacuum pump discharge to a burn stack for safe disposal, as is currently done in slush production facilities, it is intended for the proposed slush maintenance unit of the present invention to utilize the hydrogen in a gas turbine cycle to provide power for the slush maintenance unit.

As seen in the Figure, the hydrogen discharged by the vacuum pump 114 is ducted to a compressor 124, where it is compressed to a suitable pressure to supply a gas generator (combustion chamber) 125 and a power turbine 126. An air compressor 127 compresses ambient air introduced from inlet 128 through line 129 for combustion with the hydrogen vapor. The products of combustion are discharged through gas turbines 126 and 130 to drive the vacuum pump 114 and the compressors 124 and 127. The size of the air compressor 127 can be chosen to provide approximately 100% excess air for combustion. Consequently, the turbine exhausts should be hydrogen-free and may be simply discharged to the atmosphere.

The vacuum pump 114 and the compressors 124 and 127 may be driven by separate turbines 130 and 126, as shown, or as an alternative, the vacuum pump and the compressors may be put on a common shaft driven by a single turbine. The cold vapor inlet to vacuum pump 114 results in a cold vapor inlet to compressor 124, thereby greatly reducing the size and power requirements of compressor 124 for a given mass flow rate of vapor.

Due to the large energy release of burning hydrogen, excess power will be available from the turbines. This excess power can be used to drive an electric generator 131 or some other type of power take-off. The excess power can be used for propelling the mobile slush maintenance unit, driving hydraulic pumps for any hydraulic power requirements (e.g., manipulation of umbilical lines) or for powering a variety of services. The turbine exhaust can be used as a heat source, if required, as for example as a purge gas heater.

To start the refrigeration/power system of the slush maintenance unit, the compressor shaft is initially driven by an electric motor 132. At a predetermined speed, the gas generator is ignited and the power turbine drives the unit to full speed. When the turbine takes over, a clutch 133 releases the electric motor 132 from the driven shaft. This is similar to starting a jet engine. The starter motor 132 can be powered by a battery on the slush maintenance unit. After start-up of the slush maintenance unit refrigeration/power system, the battery can be recharged by the electric generator 131, a practice similar to that known in the automotive industry.

It is important to note that the proposed system is totally independent of external power sources. All of the required power is derived from hydrogen gas which would otherwise be wasted. This feature of the apparatus of this invention eliminates the need for major facility modifications to provide large amounts of electrical power for the production of slush hydrogen. The self-powered feature also contribute to the required mobility of the unit. It is possible that the SMU can serve as the aircraft tow vehicle in addition to maintaining the on-board slush quality.

The invention contemplates attachment of the SMU to the flight vehicle during the initial chill down and loading operation at the fixed fueling location. During this time, the slush maintenance unit tanks can be filled and the slush maintenance unit refrigeration/power system activated to attain stable operating conditions prior to the tow to the take-off site. During the vehicle chilldown operation, the boil-off from the vehicle is ducted through the triple point catch tank 109. The boil-off hydrogen vapor is then ducted through line or conduit 330, the sealable fitting 332 and a second line or conduit 334 to a fixed burn stack 200 for disposal. The chilldown boil-off hydrogen from the make-up tank 115 is also ducted through a line or conduit 340, a sealable fitting 342 and the line or conduit 334 to the fixed burn stack 200 for disposal.

When the slush maintenance unit moves with the vehicle to the take-off site, the liquid in the catch tank 109 is subcooled (vapor pressure is less than atmospheric pressure). Moreover, there is a continuous outflow of liquid to the slush hydrogen generator 101. Consequently, there will be no outflow through the burn stack during the tow operation, barring a failure of the pressurization system. Even if there is a failure of the pressurization system, the outflow would be almost totally helium. Therefore, there should be no need for a burn stack for the catch tank during the tow period. As shown in the Figure, a disconnect fitting 350 is provided in line 334 to permit the slush maintenance unit to be disconnected from line 336 leading to the burn stack 200 during this phase of the operation.

As a further safety measure, the relief valve for the catch tank 109 could be diverted by a three way valve 134 to the inlet of the vacuum pump 114 for safe disposal of hydrogen in the event of some unspecified failure in the catch tank which causes production of large amounts of hydrogen vapor, as for example a massive failure of tank insulation.

Similarly, the make-up tank 115, which continually supplies make-up liquid hydrogen to the catch tank 109 to replace the hydrogen evaporated in the slush hydrogen generator 101, should not have a requirement for venting during the tow period.

However, inasmuch as the make-up tank 115 is primarily pressurized by a bootstrap hydrogen pressure buildup circuit, a failure of the pressurization system could cause an overboard loss of hydrogen vapor. To avoid the need for a contingency portable burn stack for the make-up tank 115, during the towing operation, the make-up tank relief valve discharge could also be diverted by a three way valve 135 to the inlet of the vacuum pump for safe disposal of any vented hydrogen. The cross-over duct 136 and valve means is shown in the Figure.

The basic system and procedures described hereinabove for the slush maintenance unit of the present invention can readily be adapted for production of slush hydrogen for the main slush hydrogen storage tank (not shown, but accessible through sealable fitting 360, and then through conduit 362 which may be provided with appropriate valving and meter devices) for the operation base.

For the main slush hydrogen production, the vehicle tanks, as shown in the Figure, would be replaced by the main slush hydrogen storage tank. The function of the make-up tank could be performed by the base liquid hydrogen supply system (not shown), which could be fed through line a sealable fitting 372 into line or conduit 370 and then into tank 115. The rate of supply of liquid hydrogen may be controlled via liquid level sensor 374 coupled with valve 376 and line 370.

The use of the described system for the main slush hydrogen supply will result in additional major cost savings by greatly reducing the need for externally-supplied electrical power. The reduced size and weight of the hardware should provide additional cost savings for facility fabrication and operation.

While certain representative embodiments and details have been shown for the purpose of illustrating the invention, it will be apparent to those skilled in this art that various changes and modifications may be made therein without departing from the spirit or scope of this invention.

What I claim is:

1. Apparatus for maintaining predetermined density of slush hydrogen in the fuel tanks of an aerospace vehicle, comprising:
    means for collecting liquid hydrogen from the vehicle tanks,
    means, communicating with said collecting means, for converting said liquid hydrogen to a slush hydrogen, said converting means including
        first pumping means, including a vacuum pump receiving cold vapor directly from said converting means, for maintaining a predetermined slush density in said converting means, and
        second pumping means for delivering said slush hydrogen to said aerospace vehicle to be used as a powering fuel.

2. The apparatus of claim 1, wherein said converting means further includes means for feeding liquid hydrogen into said converting means to replenish liquid hydrogen which has been converted in the making of slush hydrogen.

3. The apparatus of claim 2, wherein said feeding means comprises level sensor means in said converting means for detecting the level of slush hydrogen therein, conduit means fluidly connecting said collecting means with said converting means, and valve means disposed in fluid communication with said conduit means, said valve means being selectively opened to allow liquid hydrogen to flow to said converting means in response to detection of a predetermined level of slush hydrogen in said converting means.

4. The apparatus of claim 1, wherein said vacuum pump is fluidly connected with compressor means.

5. The apparatus of claim 1, wherein said first pumping means includes power take-off means operatively coupled with at least one compressor means for generating usable power.

6. The apparatus of claim 1, wherein said converting means comprises means for continuously producing slush hydrogen at a high rate.

7. The apparatus of claim 6, wherein said producing means comprises an evaporative cooling apparatus.

8. A self-powered, mobile maintenance unit for continuously supplying slush hydrogen as a powering fuel to an aerospace vehicle prior to take-off, comprising:
    means for obtaining liquid hydrogen from the vehicle,
    a slush hydrogen generator,
    means for delivering said obtained liquid hydrogen to said slush hydrogen generator so that said liquid hydrogen can be converted back to slush hydrogen,
    pump means, communicating with cold vapors in said slush hydrogen generator, for developing a vacuum in a region of said generator whereby a solid hydrogen fraction is produced in said slush hydrogen generator, and
    means for delivering said slush hydrogen mixture to said aerospace vehicle to be used as said powering fuel.

9. Apparatus for continuously replenishing slush hydrogen for use in powering an aerospace vehicle, comprising:
    means for collecting liquid hydrogen returning from the vehicle,
    means for delivering said returned hydrogen to a slush hydrogen generator to convert the liquid hydrogen back to slush hydrogen,
    means for returning said slush hydrogen back to fuel tanks in the aerospace vehicle,
    means for continuously making up hydrogen lost in the slush hydrogen production process,
    means for substantially reducing the size and power requirements of machinery used in the production of slush hydrogen, whereby said slush hydrogen production machinery can be incorporated into a mobile unit,
    means to generate all power required by the mobile unit by using hydrogen which would otherwise be wasted through disposal into a burn stack, thereby also eliminating the need for a mobile burn stack, and
    means to provide energy for miscellaneous functions associated with the mobile unit through use of the excess power generating capability of the burnable hydrogen.

10. A method for continuously supplying slush hydrogen as a powering fuel to an aerospace vehicle prior to take-off, comprising:
    obtaining liquid hydrogen from the vehicle,
    providing a slush hydrogen generator,
    delivering said obtained liquid hydrogen to said slush hydrogen generator so that said liquid hydrogen can be converted back to slush hydrogen,
    providing pump means communicating with cold vapors in said slush hydrogen generator,
    developing a vacuum via said pump means in a region of said generator whereby a solid hydrogen fraction is produced in said slush hydrogen generator, and
    delivering said slush hydrogen mixture to said aerospace vehicle to be used as said powering fuel.

* * * * *